United States Patent [19]

Paller

[11] 4,397,150
[45] Aug. 9, 1983

[54] POWER GENERATING APPARATUS USING RADIANT ENERGY

[76] Inventor: Marc S. Paller, 1251 Dickinson Dr., Apartment 13-L, Coral Gables, Fla. 33146

[21] Appl. No.: 148,136

[22] Filed: May 9, 1980

[51] Int. Cl.³ .............................................. F03G 7/02
[52] U.S. Cl. ............................ 60/641.8; 60/641.13; 356/216
[58] Field of Search .......................... 60/641.8, 641.13; 356/216

[56] References Cited

FOREIGN PATENT DOCUMENTS 1395137  5/1975  United Kingdom ................ 250/215

Primary Examiner—Allen M. Ostrager
Attorney, Agent, or Firm—Robert C. Podwil

[57] ABSTRACT

Power generating apparatus for conversion of radiant to mechanical or electrical energy utilizes radiometric drive rotors coupled to mechanical or electrical output devices; radiometer internal pressure regulating means controls output speed and power. Particular vane constructions enhance the radiometric effect.

13 Claims, 9 Drawing Figures

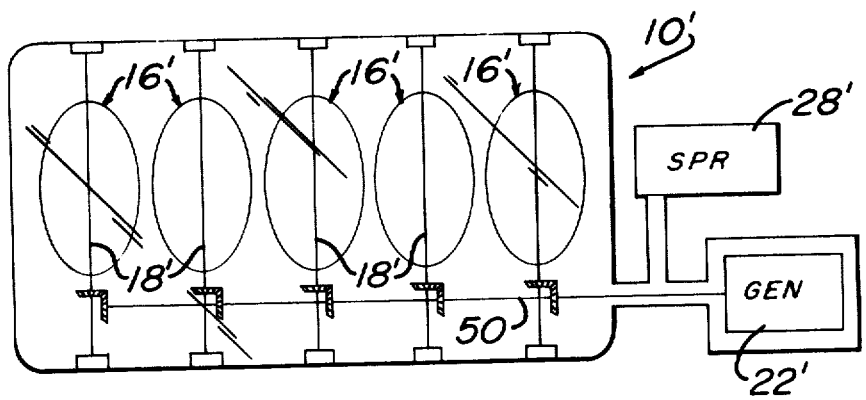
FIG. 2
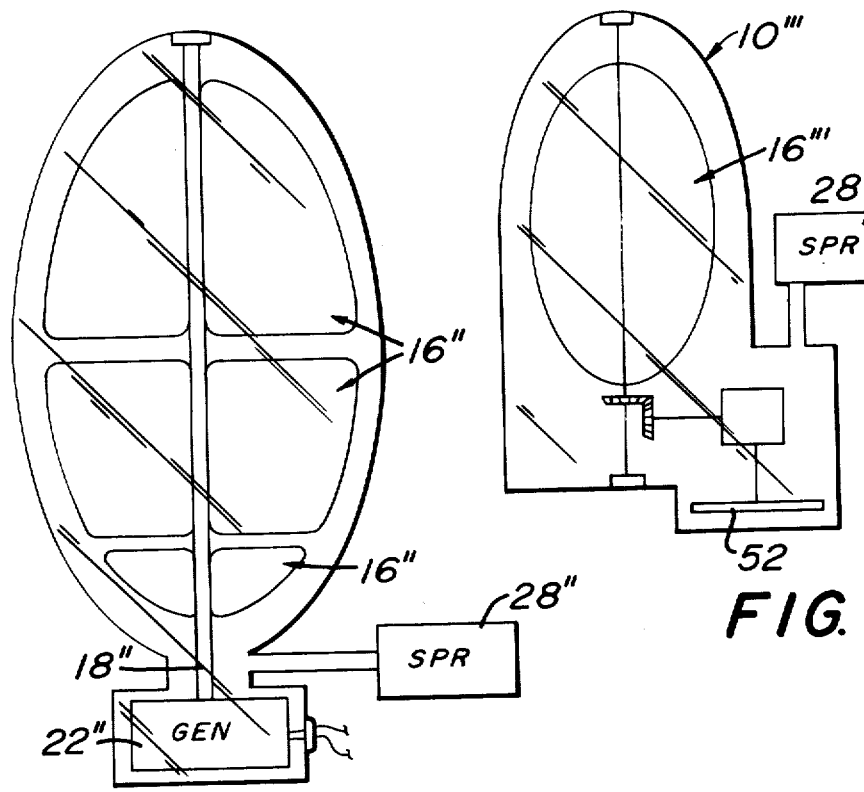
FIG. 3
FIG. 4

POWER GENERATING APPARATUS USING RADIANT ENERGY

BACKGROUND OF THE INVENTION

This invention relates to power generating apparatus using radiant energy, and more particularly, to such apparatus in which devices of the general type known as "radiometers" are put to practical use.

A number of proposals have been made for apparatus capable of converting radiant energy, most notably solar energy, directly into mechanical or electrical energy for useful purposes. Examples of apparatus proposed for this purpose may be found in the following U.S. Patents, amoung others: No. 3,031,852, issued May 1, 1962, to White; No. 3,048,006, issued Aug. 7, 1962, to Goodman; No. 3,137,125, issued June 16, 1964, to Kyryluk; and No. 3,348,374, issued Oct. 24, 1967, to Schalkowsky.

U.S. Pat. No. 182,172, issued Sept. 12, 1876, to Crookes, described the device which has come to be known as a radiometer, an instrument in which radiation is detected and made measurable by movement of a surface suspended within a partly evacuated vessel. Thus, radiometers have long been known as laboratory curiosities, or, on a more practical level, as means for measuring the intensity of radiation (see, for example, U.S. Pat. No. 1,000,831 issued Aug. 15, 1911, to Martin). Although it has been proposed that radiometer-like devices be used to produce useful work in special applications, such as the space application disclosed in U.S. Pat. No. 3,348,374, issued Oct. 24, 1967, to Schalkowsky, the conventional view has been that radiometers are incapable of useful work, at least in ordinary environments. See, for example, the abovementioned patent to Kyryluk, column 1, lines 10–17.

It is a principal object of the present invention to provide apparatus wherein the principles of the radiometer are applied to produce useful work.

It is another object of this invention to provide apparatus wherein a radiometer provides useful mechanical energy, either directly by mechanical linkage, or through an intermediary electrical device.

In a broad aspect, it is an object of this invention to provide an inexpensive, practical and reasonably efficient means for converting radiation energy, such as solar energy, to useful work.

Other objects will appear hereinafter.

The foregoing and other objects of this invention are realized, in one presently preferred form of the invention (which constitutes the best mode presently contemplated for carrying out the invention), by apparatus which comprises a radiation-transparent housing, a drive rotor mounted in the housing for rotation therein, and a plurality of circumferentially spaced longitudinally extending vanes disposed on the rotor, each vane having one dark and one light surface and the drive rotor being coupled to mechanical or electrical power take-off means. As is known in the art, the torque created by a radiometer may be varied as a function of the gas pressure within the housing and the length of the moment arm to the centroid of the vane. Thus it is also, contemplated, in accordance with the preferred form of the present invention, that an operator be provided with means for regulating gas pressure within the housing, to thereby control the output of the apparatus.

There are seen in the drawings forms of the invention which are presently preferred, it being understood that this invention is not limited to the precise arrangements and instrumentalities shown.

FIG. 2 is a side elevation view of a modified form of the invention, using multiple rotors.

FIG. 3 is a side elevation view of another modification of the invention, using multiple vanes mounted on a coaxial shaft.

FIG. 4 is a side elevation view of yet another modification of the invention.

Figure 1:
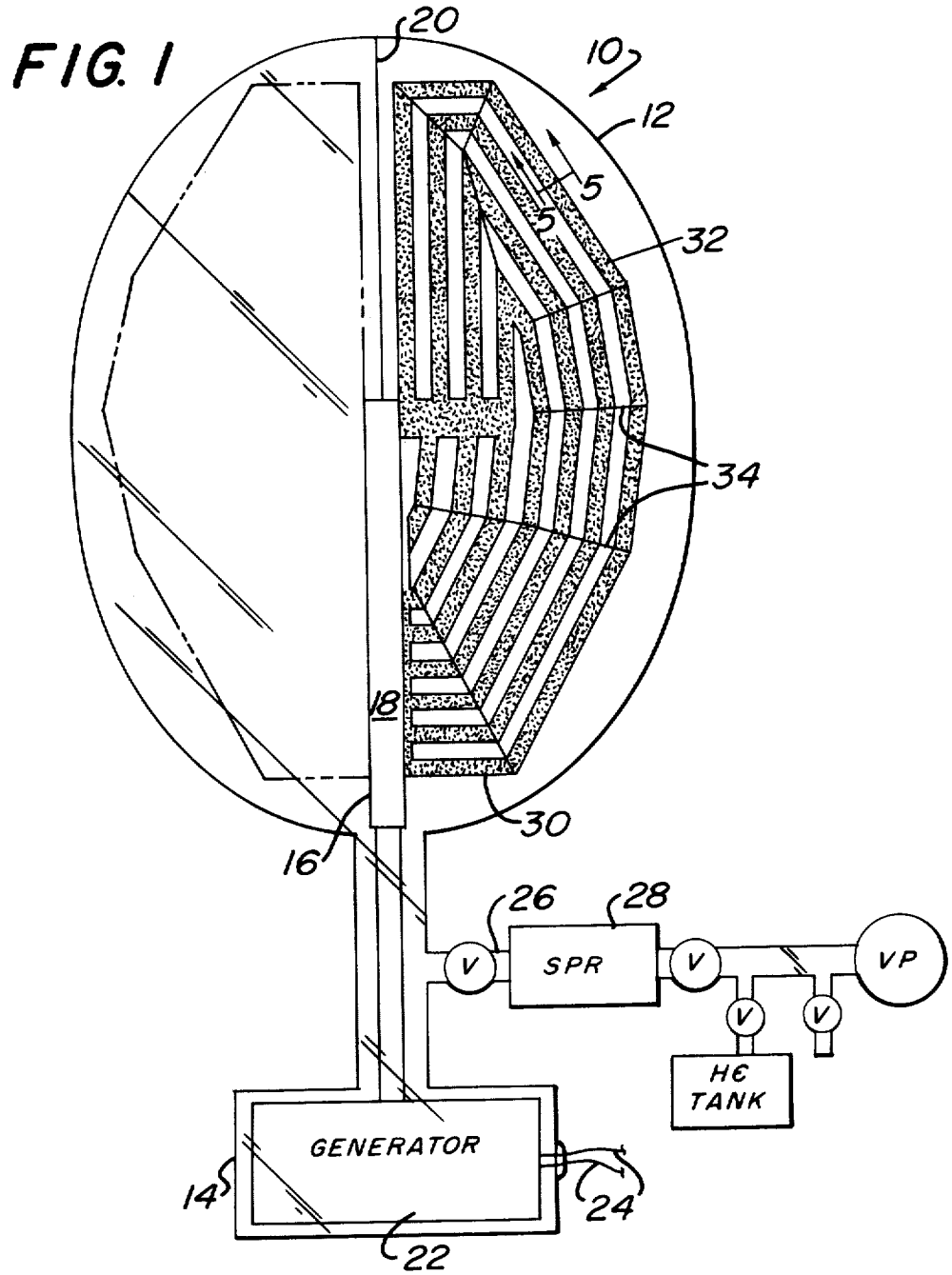
FIG. 1 is a side elevation view, in cross-section, showing power generating apparatus in accordance with the invention.

Referring now to the drawings in detail, wherein like numerals indicate like elements, there is seen in FIG. 1, power generating apparatus designated generally by the reference numeral 10.

The apparatus 10 comprises a radiation-transparent housing or envelope 12, mounted upon a base 14.

Rotatably mounted within the housing 12 is a drive rotor, designated generally by the reference numeral 16. In the illustrated embodiment, the drive rotor 16 comprises a main shaft 18, the upper end of which is rotably supported and stablized by a strut 20.

The lower end of the main shaft is drivingly connected, by means of a weld, splines or other conventional connectors, not shown, to the input shaft of a generator 22, disposed in the illustrated embodiment within the base 14, the output 24 of the generator 22 being conducted through the base 14 in a fluid pressure-tight manner.

In fluid communication with the housing 12 by means of a valved conduit 26 is a pressure regulator 28, the function of which will be described in greater detail later.

Coupled to the main shaft 18 of the drive rotor 16 are a series of vanes 30, which will also be described in detail later. The vanes 30 are circumferentially spaced about the main shaft 18, and are longitudinally disposed with respect to the axis of the shaft 18. The main shaft 18 is supported by suitable low-friction bearings, the precise details of which will occur to those skilled in the art. For example, in one presently contemplated form of the apparatus 10, the main shaft 18 may be provided with low friction bearings made up of magnets of opposing polarity, so that solid-to-solid contact at the bearing points is avoided. Depending upon the size and configuration of the main shaft 18, other kinds of bearings, such as ball, roller, air or the like, could be used.

Figure 5:
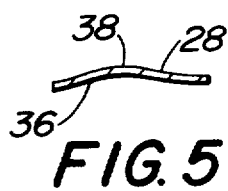
FIG. 5 is a cross-sectional view, taken along the line 5—5 in FIG. 1, showing details of a preferred vane construction.
Figure 6:
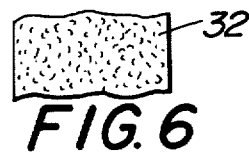
FIG. 6 is an enlarged view, showing details of the vane construction.

Referring now to FIGS. 5 and 6, the configuration of the vanes 30 will be described in greater detail.

From a theoretical viewpoint, the radiometric force is not perfectly understood, but a description of the accepted theory may be found in Smith, J. H., "Determination of Molecular Diameters By the Use of the Crooke's Radiometer", *J. Chem. ED.* 1970, 47(8), 590–593, while the mathematical formulation is found in Wu Y., "Kinetic Theory of Molecular Radiometric Force and Radiometer", *Annalen Der Physik* [7], 19, 3-4 (1967), pp. 144-153. It has been found, however, that the radiometric force, and therefore, the torque capable of being produced by a radiometric vane, is enhanced at higher pressures, by an increase in the length of the edge of the vane and at lower pressures by an increase in the vane's surface area. Referring to FIGS. 5 and 6, the vane 30 in the illustrated embodiment is made up of an array of light gauge strip-like aluminum elements 32. The strips 32 may be assembled in any structurally sound manner to create a slightly open grid or latticework presenting the faces of the strips 32 (and hence, the vanes 30) to incident radiation. Referring again to FIG. 1, the strips 32 may be supported or braced by suitable struts 34. The preferred width of the strips 32 is determined by the amount of material necessary to produce the highest possible temperature on the dark surface, and may be determined empiricably.

FIG. 5, illustrates another detail of the strips 32. As is well-known, the movement of a radiometric rotor is such that under normal conditions the dark face of the vane recedes from the source of radiation. In accordance with the present invention, the dark face, designated by the reference numeral 36, is made concave while the light face 38 is of a convex configuration. Such a configuration also tends to enhance the radiometric force and torque of the vanes 30.

Figure 7:
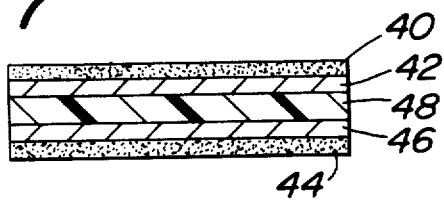
FIG. 7 is an enlarged cross-sectional view showing details of the vane construction.

In one presently preferred construction of the vanes 30, the elements of the strips 32 are actually made in five distinct layers, as follows:

With reference to FIG. 7, the dark face of the element 32 comprises a layer 40 of black sulfide, disposed on a substrate 42 of aluminum. The light face of the element 32 comprises a layer 44 of magnesium carbonate disposed of a second substrate 46 of aluminum. Disposed between the substrates 42 and 46 is a spacer strip 48 of plastic polymeric material such as polystyrene or polyurethene, and having thermal insulating qualities. In a variation of the above described construction, other thermal insulators could be substituted for the spacer strip 48. Radiometric force and moment arm, and consequently, torque, are maximized when the pressure, type of gas selected, ambient temperature, and shape of the capsule; the shape, size, composition, and temperature build-up of the vanes; and the intensity and emission frequencies of the radiation source are at all of their optimum point. Temperature isotherms that develop around the vanes are directly dependent upon the mean free path of the gas molecules within the envelope as well as their collision cross-section. The above-described construction exploits these characteristics.

Another aspect of the present invention is the control of rotor speed and power output by regulating the internal pressure within the housing 12. The radiometric effect varies as a function of the kind of gas within the housing, and also as a function of the gas pressure within the housing. See: "Experimental Contributions to the Radiometric Effect", Bruche & Littwin, *Zeits f. Physik*, 52. 4–6, pps. 318-333 (1928)., in which comparative data for a given gas revealed a maxium radiometric effect with a vacuum of approximately one-fortieth of a millimeter of mercury, the effect being approximately twenty percent in excess of that obtained at one-tenth of a millimeter of mercury and approximately one hundred thirty percent of that obtained at one one hundredth of a millimeter of mercury. In accordance with the present invention, the preferred gas is helium, at an optimum pressure of 0.065 Torr. Use of means such as the pressure regulator 28 permits regulation of the power output of the apparatus 10. In a presently preferred form of the apparatus the pressure regulator 28 comprises of an intermediate pressure chamber which may be selectively sealed off from the envelope 12 to either add or reduce pressure in the envelope 12, thereby permitting precise regulation of the power output of the apparatus 10.

The foregoing principles may be applied to other physical embodiments of the apparatus 10 to provide results desired for a particular application. For example, referring now to FIG. 2, there is seen a modified form of the apparatus, wherein elements corresponding to those previously described are designated by like primed reference numerals.

The apparatus 10' illustrated in FIG. 2 utilizes multiple drive rotors 16', each mounted upon its own shaft 18'. Each drive rotor 16' is geared to a common drive shaft 50, which, in turn, is coupled to a generator 22'.

Referring now to FIG. 3, there is seen still another modification of the apparatus, in which elements corresponding to those previously described are designated by like double-primed reference numerals. In the embodiment shown in FIG. 3, multiple drive rotors 16" are mounted on a common main shaft 18", and drive a generator 22".

In the embodiment of the invention illustrated in FIG. 4, and wherein elements corresponding to those previously described are indicated by like triple primed reference numerals, there is seen a power generating apparatus 10''' in which mechanical energy produced by the drive rotor 16''' is stored in a flywheel 52.

Figure 6A:
FIG. 6(a) is a view similar to FIG. 6, showing details of an optional form of vane construction.

Other variations may occur to those skilled in the art. For example, radiation collectors, such as mirrors, may be associated with the apparatus in any of its forms, to enhance the radiation density incident upon the vanes of the rotor. Also, "selective coatings" may be applied to the vane for increasing the absorbtivity and reflectance of incident electramagnetic radiation. Although the vanes 30 have been described above in their presently preferred form, other variations are possible, and may be desirable in some applications. For example, single, double or triple helical vanes may prove useful, as may be, under some conditions, vanes which are screens or more common solid elements. Also, the lengths of the edges of the vanes may be increased, if so desired, by providing the strips 32 with crenulated edges made up of a series of finger-like projections and notches. Such a strip configuration is seen in FIG. 6(a).

Figure 8:
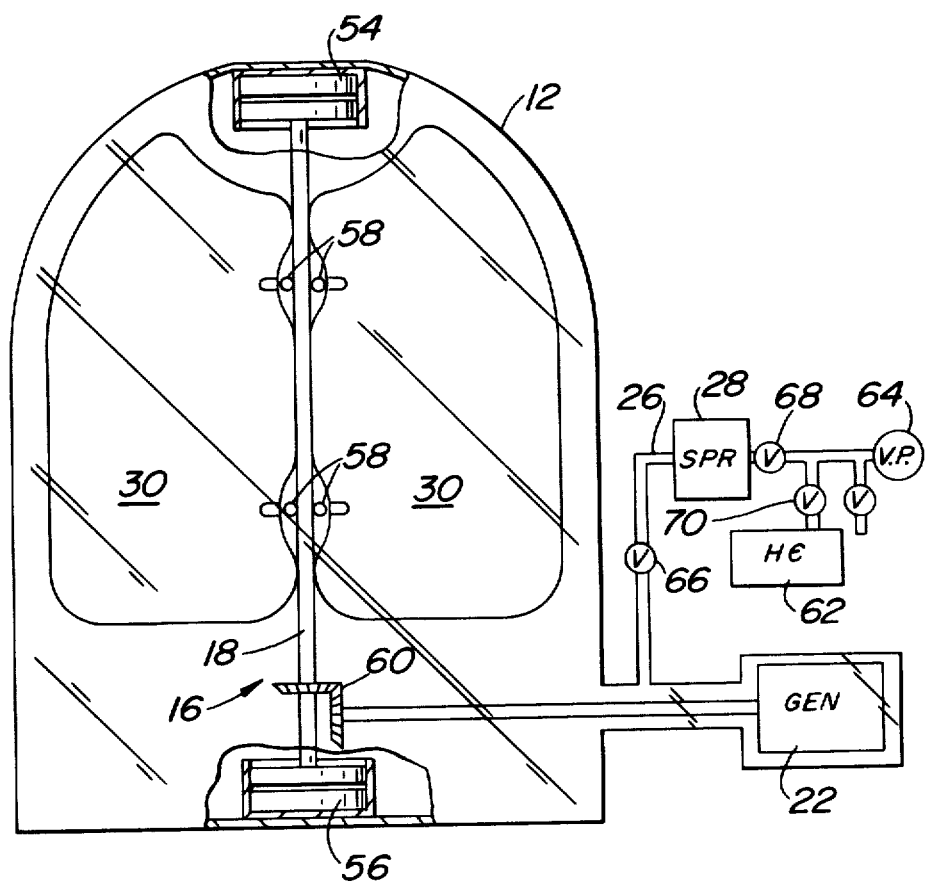
FIG. 8 is a perspective view of another embodiment of the invention.

Referring now to FIG. 8, there is seen, somewhat diagrammatically, a working embodiment of the invention. In the embodiment of FIG. 8, the drive rotor 16 is supported within the housing 12 by magnetic bearings 54 and 56. The vanes 30 are secured to the main shaft 18 of the drive rotor 16 by means of bolts 58 or other suitable fasteners. Gearing 60 or other suitable power take-off means transmits power from the drive rotor 16 to a generator 22 as described above. Also as described above, a pressure regulator 28 is associated with the housing 12 by means of a conduit 26. Associated with the pressure regulator 28 is a source 62 of working fluid, preferably as in the illustrated embodiment, helium. Also associated with the pressure regulator 28 is a vacuum pump 64, shown only diagrammatically. Selective application of vacuum and working fluid allows for control of the apparatus in the manner described above. Valves 66, 68 and 70 associated with the pressure regulator 28 and source 62 provide means by which working fluid from the source 62 may be introduced into the housing 12, or vacuum applied to the system by the vacuum pump 64 to evacuate the system.

The present invention may be embodied in other specific forms without departing from its spirit or essential attributes, and, accordingly, reference to should be made to the appended claims rather than the foregoing specification as indicating the scope of the invention.

I claim:

1. Power generating apparatus comprising a radiation-transparent housing, a drive rotor mounted in said housing for rotation therein, a plurality of circumferentially spaced longitudinally extending radiometric vanes disposed on said rotor, each vane having one surface thereof having radiation-absorptive characteristics and the other surface thereof having radiation reflective characteristics, power take-off means operably coupled to said drive rotor to produce useful work, and pressure regulating means operatively coupled to said housing for selectively regulating gas pressure within said housing.

2. Power generating apparatus in accordance with claim 1, said pressure regulating means including means for selectively introducing a working gas into said housing.

3. Power generating apparatus in accordance with claim 1, wherein said power take-off means comprises an electrical generator disposed within said housing, said drive rotor being mechanically coupled to said generator to drive said generator.

4. Power generating apparatus in accordance with claim 1, wherein said vanes comprise a sinuous surface comprising a plurality of strip-like elements.

5. Power generating apparatus in accordance with claim 4, wherein said strip-like elements are arcuate in cross-section, said surface thereof having radiation absorptive characteristics being disposed on the concave surface of each element.

6. Power generating apparatus in accordance with claim 1, wherein a plurality of drive rotors are mounted within a single housing.

7. Power gernerating apparatus in accordance with claim 1, wherein said drive rotor comprises a plurality of sets of vanes, coaxially coupled to a single shaft.

8. Power generating apparatus in accordance with claim 1, wherein one surface of said vanes has a coating of magnesium carbonate, and the other surface has a coating of black sulfide.

9. Power generating apparatus in accordance with claim 8, wherein said vanes comprise a plurality of aluminum base layers, a layer of black sulfide disposed on one of said base layers and a layer of magnesium carbonate disposed on the other of said layers, and said aluminum layers being separated by a thermally insulating layer.

10. Power generating apparatus in accordance with claim 9, wherein said thermally insulating layer consists of a plastic polymeric material.

11. Power generating apparatus in accordance with claim 10, wherein said thermally insulating layer consists of an evacuated space.

12. Apparatus comprising a radiation-transparent housing, a drive rotor mounted in said housing for rotation therein, a plurality of circumferentially spaced longitudinally extending radiometric vanes disposed on said rotor, each vane having one surface thereof having radiation-absorbtive characteristics and the other surface thereof having radiation reflective characteristics, and means operatively coupled to said housing for selectively regulating gas composition and pressure within said housing, said means operatively coupled to said housing comprising a source of working fluid, vacuum means and means for selectively placing said working fluid and said vacuum means in fluid communication with said housing.

13. Apparatus in accordance with claim 12, wherein said means for selectively placing said working fluid and said vacuum means in fluid communication with said housing comprises an intermediate pressure chamber, valve means disposed between said intermediate pressure chamber and said housing for selectively placing said intermediate pressure chamber in fluid communication with said housing, valve means disposed between said working fluid and said intermediate pressure chamber for selectively placing said working fluid in fluid communication with said intermediate pressure chamber, and valve means disposed between said vacuum means and said intermediate pressure chamber for selectively placing said vacuum means in fluid communication with said intermediate pressure chamber.

* * * * *